United States Patent [19]

Ginatta

[11] 4,333,219
[45] Jun. 8, 1982

[54] METHOD AND MACHINE FOR RECOVERING MATERIAL FROM CONSUMED ACCUMULATOR BATTERIES

[75] Inventor: Marco Ginatta, Turin, Italy

[73] Assignees: Snamprogetti S.p.A., Milan; Elettrochimica Marco Ginatta S.p.A., Santena, both of Italy

[21] Appl. No.: 193,457

[22] Filed: Oct. 3, 1980

[30] Foreign Application Priority Data

Oct. 16, 1979 [IT] Italy .............................. 69007 A/79

[51] Int. Cl.³ ...................... B23Q 17/00; B23P 19/00
[52] U.S. Cl. ..................................... 29/403.3; 29/763
[58] Field of Search ..................... 29/403.1, 403.3, 763

[56] References Cited

U.S. PATENT DOCUMENTS 2,825,125  3/1958  Smith ................................. 29/403.3
4,058,886  11/1977  Alvarez ................................ 29/763

Primary Examiner—Lowell A. Larson
Assistant Examiner—V. K. Rising
Attorney, Agent, or Firm—Morgan, Finnegan, Pine, Foley & Lee

[57] ABSTRACT

A method for recovering material from consumed accumulator batteries consists of providing a rotatable table, keeping the table under continuous rotation, continuously feeding a row of batteries tangentially to the periphery of the table in such a manner as to bring one of the side walls of the casing of each battery into contact with the table periphery such that a portion of said side wall projects below the table contour, exerting a radial thrust on that side wall of each battery casing which is opposite the wall in contact with the table periphery such as to keep said battery adhering to said table over a path corresponding to a substantial angle of rotation of the table, separating the lower horizontal wall of the respective casing from each battery by a cutting action carried out on that part of each battery which projects below the table contour while the battery is adhering to the table, so as to enable said wall to be separated from the remaining part of the battery by gravity, and then releasing the radial thrust exerted on each battery at the end of said path so as to enable the table to be separated from said remaining part of the battery by gravity.

The invention also relates to a machine for carrying out the method.

25 Claims, 5 Drawing Figures

METHOD AND MACHINE FOR RECOVERING MATERIAL FROM CONSUMED ACCUMULATOR BATTERIES

This invention relates generally to industrial material recovery processes, and in particular to those processes for producing lead from consumed vehicle accumulator batteries.

It is well known to experts of the art that this recovery can be carried out either by pyrometallurgical processes or by electrochemical processes. In both cases it is necessary firstly to open the battery casing by removing at least one of its walls by cutting, and then draining the battery electrolytic solution from the casing. In recovery by pyrometallurgical processes it is also necessary to previously separate the non-metal materials from the metal components of the battery after opening the casing.

The present invention provides a method for continuously recovering material from consumed accumulator batteries particularly of the type comprising a parallelepiped-shaped casing, which are intended for subsequent pyrometallurgical or electrochemical processing for the production of lead, the method being economical and easily mechanisable to allow high production rates.

The method according to the invention comprises the following stages:
providing a horizontal rotatable table,
keeping said table under continuous rotation,
continuously feeding a row of batteries tangentially to the periphery of the table in such a manner as to bring one of the side walls of the casing of each battery into contact with the table periphery such that a portion of said side wall projects below the table contour,
exerting a radial thrust on that side wall of each battery casing which is opposite the wall in contact with the table periphery such as to keep said battery adhering to said table over a path corresponding to a substantial angle of rotation of the table,
separating the lower horizontal wall of the respective casing from each battery by a cutting action carried out on that part of each battery which projects below the table contour while said battery is adhering to the table, so as to enable said wall to be separated from the remaining part of the battery by gravity,
releasing the radial thrust exerted on each battery at the end of said path so as to enable the table to be separated from said remaining part of the battery by gravity.

If the batteries are to be subsequently subjected to electrochemical recovery processes, they are fed tangentially to the table periphery in their normal position of use, i.e. with the casing cover facing upwards. If however the batteries are to be subjected to treatment by pyrometallurgical processes, they are fed tangentially to the table periphery in an inverted position relative to their normal position of use. In this case, following the stage in which the lower horizontal wall of the respective casing is separated from each battery by cutting, the method further comprises vibrating the remaining part of each battery while it is adhering to the table in order to facilitate separation of the contents of the battery from the respective casing and enable said contents to be separated from the remaining part of the battery by gravity.

The method according to the invention also provides for separating not only the lower horizontal wall of the respective casing, but also and simultaneously the upper horizontal wall of said casing from each battery by cutting.

The invention also relates to a particularly simple, functional and economical machine for continuously carrying out said method.

The machine according to the invention comprises:
a horizontal rotatable table,
means for keeping said table under continuous rotation,
feed means for continuously feeding a row of batteries tangentially to the periphery of the table in such a manner as to bring one of the side walls of the casing of each battery into contact with the table periphery such that a portion of said side wall projects at least below the table contour,
means for exerting a radial thrust on that side wall of each battery casing which is opposite the wall in contact with the table periphery such as to keep said battery adhering to said table over a path corresponding to a substantial angle of rotation of the table,
cutting means acting on that part of each battery which projects below the table contour while said battery is adhering to the table, so as to separate the lower horizontal wall of the respective casing from each battery,
collection means for receiving said horizontal walls which separate by gravity from the remaining parts of the batteries downstream of the cutting means, and for receiving the remaining parts of said batteries which separate by gravity from the rotatable table at the end of said table path.

The machine according to the invention enables high production rates to be obtained while maintaining operational costs at extremely low levels.

According to the invention, the machine also comprises vibration means acting on the remaining parts of the batteries downstream of the cutting means in order to facilitate separation of the contents of each battery from the respective casing, and collection means for receiving the battery contents which separate by gravity from the remaining parts of the batteries.

According to a particularly advantageous characteristic of the invention, the table periphery is provided with support means arranged to assume a local flat configuration tangential to the table following contact between said side wall of each battery casing and the table periphery, and to maintain said configuration over the entire said path of the table. This characteristic ensures a correct support for the batteries on the periphery of the rotatable table during the cutting operation.

Further characteristics and advantages of the invention will be apparent from the description given hereinafter with reference to the accompanying drawings which illustrate by way of nonlimiting example a preferred embodiment of a machine for carrying out the method according to the invention, and in which.

With reference to the drawings, the reference numeral 10 indicates a parallelepiped housing in which a support framework 12 is disposed, consisting of a series of horizontal, vertical and oblique beams. By way of rolling bearings, not shown, the support framework 12 rotatably supports the ends of a vertical shaft 14 on which a rotatable table 16 is mounted. The rotatable table 16 is constituted by a wheel with a hub, not shown on the drawings, keyed on to the shaft 14, and a rim 18 connected to the hub by a set of spokes, not shown on the drawings. A circumferential set of radial supports 20 project outwards from the rim 18, and each carries at its respective outer end a pair of vertical pins 22, on the ends of each of which there is hinged a vertical support plate 24. Each support plate 24 is arranged to make limited angular movements about the respective pin 22 until it becomes aligned with the adjacent plate 24 tangentially to the table 16. Each support plate 24 comprises an outer surface with a high coefficient of friction, for example a surface faced with abrasive material.

The rotatable table 16 is also provided with a pair of opposing cone frustum cowls 26 extending over each of its faces from the shaft 14 to the inner edge of the rim 18.

The diameter of the rotatable table 16 is preferably about 4 meters, and the length of each support plate 24 is of the order of about 20 cm.

The reference numeral 28 indicates an endless flexible belt which is mobile about deviation rollers of vertical axis 30 supported by the support framework 12. One of the deviation rollers 30 is rotated by an electric motor 31 and a flexible belt transmission. The endless belt 28 comprises a branch 28a disposed to present an arcuate surface surrounding a substantial part of the periphery of the rotatable table 16. This substantial part corresponds to an angular width of about 180°.

Figure 3:
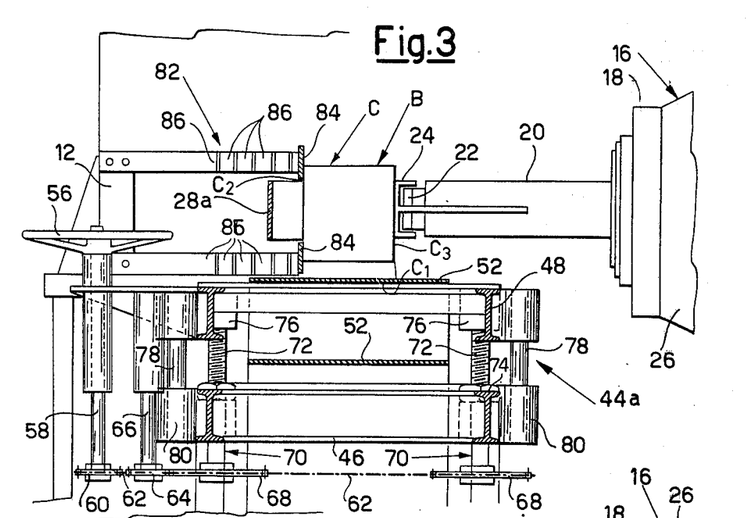
FIG. 3 is a section on the line III—III of FIG. 2 to an enlarged scale.
Figure 4:
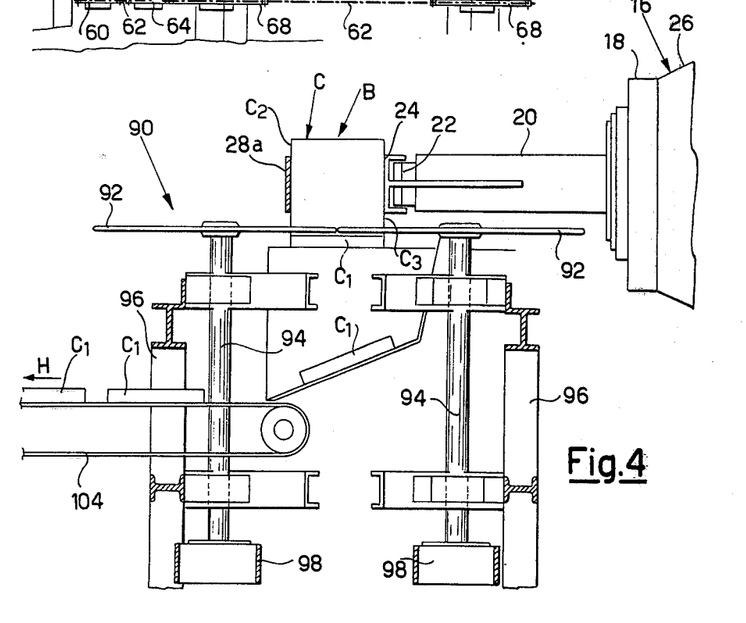
FIG. 4 is a section on the line IV—IV of FIG. 2 to an enlarged scale and FIG. 5 is a partly interrupted perspective view of a detail of the machine.

The endless belt 28 has a width equal to the width of the support plates 24, and its longitudinal edges are disposed substantially at the same level as the corresponding edges of said support plates 24, as shown in FIGS. 3 and 4.

One of the deviation rollers for the branch 28a, indicated by 32, is mounted on a slide 34 which is slidable on fixed guides 36 disposed externally to the housing 10. A counterweight 40 suspended from a structure 42 is connected to the slide 34 by a cable or chain 38. In this manner, a constant traction is exerted on the branch 28a of the endless belt 28 towards the corresponding part of the periphery of the rotatable table 16.

The endless belt 28 is of a material resistant to sulphuric acid solutions, and is preferably formed from polyester fibres coated with P.V.C.

Figure 5:
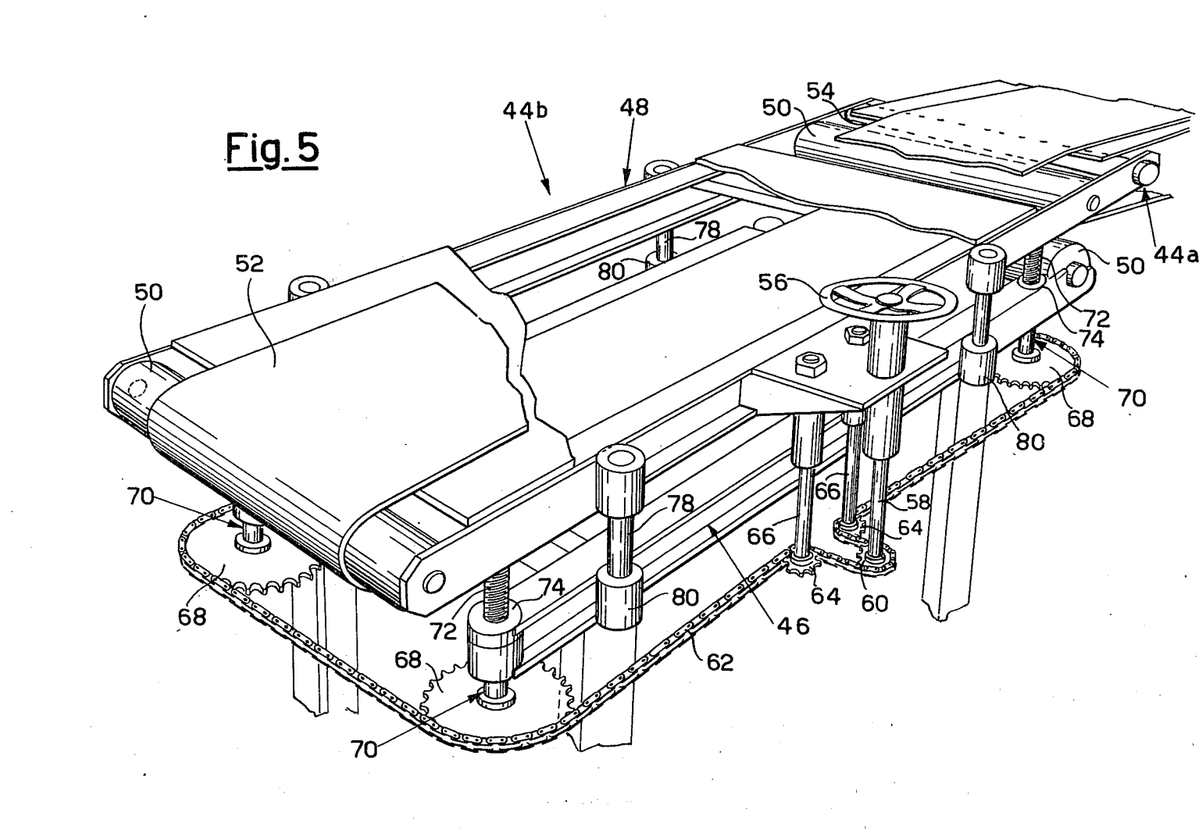

The reference numeral 44 indicates overall a feed conveyor belt comprising a part 44a of variable inclination disposed external to the casing 10, and a horizontal terminal portion 44b disposed internal to the casing 10 in a position underlying the initial part of the periphery of the table 16 surrounded by the branch 28a of the endless belt 28. The terminal portion 44b of the conveyor 44, which is shown in detail in FIGS. 3 and 5, is positioned tangentially to the periphery of the rotatable table 16. The portion 44b comprises a support base 46 carrying a horizontal frame 48 provided with deviation and support rollers 50 for the belt, indicated by 52. The inner end of the frame 48 is hinged about a horizontal transverse pin 54 to the remaining part 44a of the conveyor 44. The level of the frame 48, and consequently the level of the conveying branch of the belt 52, can be adjusted by means of a control handwheel 56 connected to a vertical shaft 58 which lowerly carries a sprocket wheel 60. The sprocket wheel 60 drives an endless chain 62 which is deviated by a pair of sprocket wheels 64 carried by respective vertical shafts 66, and passes over four toothed wheels 68 each of which is keyed to the lower end of a vertical shaft 70 which at its top comprises a thread 72. The thread 72 engages lowerly in a nut screw 74 rigid with the support structure 46, and upperly in a corresponding bush 76 carried by the lower face of the frame 48 (see FIG. 3). Four vertical guide pins 78 are also fixed to the side of the frame 48, their lower ends slidably engaging in corresponding guide bushes 80 rigid with the support structure 46. In this manner, the level of the frame 48 can be finely adjusted by rotating the handwheel 56.

The handwheel 56 could be replaced by an electric motor controllable from outside the casing 10.

Figure 1:
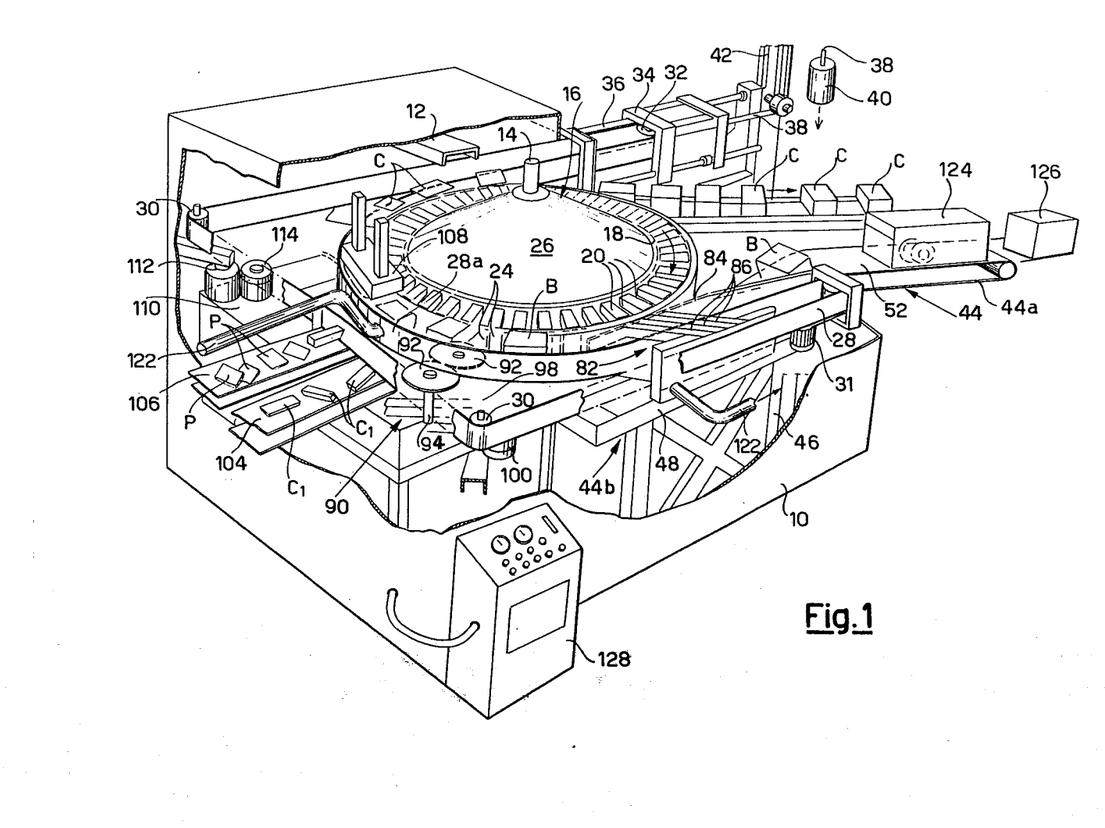
FIG. 1 is a partly interrupted diagrammatic perspective view of a machine according to the invention.
Figure 2:
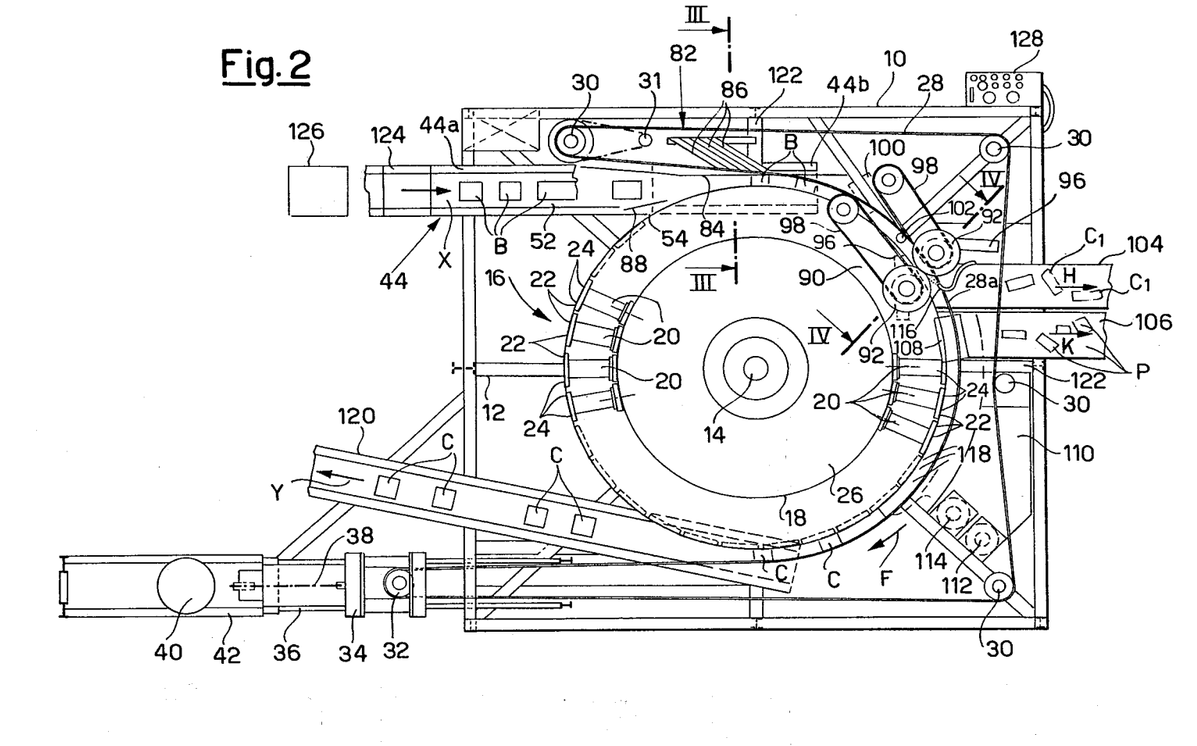
FIG. 2 is an inverted plan view of FIG. 1.

A guide device 82 for the branch 28a of the endless belt 28 is associated with the final portion 44b of the conveyor 44. As shown in FIGS. 1 to 3, the guide device 82 is formed from two overlying spring-loaded strips 84 extending horizontally on opposite sides of the branch 28a. Each strip 84 is hinged at one end to the support framework 12, and is subjected at its opposite end to the action of a set of flat springs 86 carried by the framework 12 and tending to urge it in the direction of the periphery of the rotatable table 16. There is also associated with the conveying branch of the belt 52 a spring-loaded strip 88 converging towards the upper strip 84 of the guide device 82, and forming with it a channel with spring-loaded walls (see FIG. 1).

The reference numeral 90 indicates overall a cutting unit disposed internal to the casing 10 in a position below the periphery of the rotatable table 16, downstream of the feed conveyor 44 relative to the direction of movement of the endless belt 28 indicated by the arrow F in FIG. 2.

As shown in detail in FIG. 4, the cutting unit 90 consists of a pair of circular horizontal blades 92 which oppose each other and rotate in opposite directions, and which are disposed immediately below the lower edges of the endless belt 28 and the periphery of the rotatable table 16. Each circular blade 92 is carried by the upper end of a respective vertical shaft 94 rotatably supported by a support structure 96 and rotated by an electric motor 100 by way of a flexible belt transmission 98. The support structures 96 for the shafts 94 are hinged together about a common vertical shaft 102 for the purpose of varying their relative distance apart. Positioning means are provided for locking each of the support structures 96 in the required angular position. In this manner, it is possible to adapt the cutting unit 90 comprising the blades 92 to different diameters. It is also possible to use only one of the vertical shafts 94 for controlling a single large diameter blade.

The circular blades 92 can for example consist of cutting discs with diamond-clad or preferably resinoid sectors.

The reference numeral 104 indicates a first discharge conveyor comprising an initial portion disposed in a position underlying the cutting unit 90.

A second discharge conveyor 106 is disposed to the side of the conveyor 104, and comprises an initial portion disposed in a position below the periphery of the table 16 immediately downstream of the cutting unit 90. The conveyors 104 and 106, the conveying direction of which are indicated by the arrows H and K in FIG. 2, pass to the outside of the housing 10.

The reference numeral 108 indicates a vibrating device of conventional type, supported by the framework 12 in a position immediately overlying the periphery of the rotatable table 16 at the initial portion of the second discharge conveyor 106.

A collection tank 110 for receiving the electrolytic solution from the batteries and associated with a pair of electrically driven pumps 112, 114 is disposed below the cutting unit 90 and the initial portions of the discharge conveyors 104 and 106. The pump 112 is connected to a discharge circuit, not shown in the drawings, which connects the tank 110 to the outside of the housing 10. The pump 114 feeds a hydraulic circuit terminating in a series of delivery nozzles 116 associated with the cutting unit 90, and a series of nozzles 118 disposed adjacent to the periphery of the rotatable table 16 downstream of the discharge conveyors 104 and 106, and of which the function will be described hereinafter.

The reference numeral 120 indicates a third discharge conveyor having an initial portion disposed in a position underlying the periphery of the rotatable table 16 in a zone diametrically opposite that of the final portion 44b of the feed conveyor 44. The upper branch of the discharge conveyor 120, which passes to the outside of the housing 10, is mobile in the direction indicated by the arrow Y in FIG. 2.

The reference numeral 122 indicates two exhausters disposed within the housing 10 respectively upstream and downstream of the cutting unit 90 with reference to the direction of rotation of the rotating table 16, and opening outside the housing 10.

External to the housing 10 there are also provided an inverting device 124, for example an inverting drum, and a depalletising device 126 of conventional type, these being associated with the part 44a of the feed conveyor 44.

The devices for controlling and monitoring the machine operating cycle are grouped together into a control unit 128 disposed external to the housing 10, so that the machine can be controlled by a single operator who can operate under non-polluting environmental conditions and under maximum safety.

The operation of the machine according to the invention is as follows.

A series of consumed accumulator batteries B each comprising a parallelepiped casing C are deposited on the part 44a of the feed conveyor 44. If the batteries B to be fed to the machine are grouped on pallets, the depalletising device 126 deposits the batteries B on to the belt 52 in an aligned state, with the major sides of the respective casings C positioned parallel to the conveying direction X of the conveyor 44.

If the batteries leaving the machine are to undergo pyrometallurgical processes for lead production, the inverting device 124 is operated in order to invert each battery B relative to its normal position of use, i.e. with its cover $C_1$ facing downwards. If however the batteries B leaving the machine are subsequently to undergo electrochemical recovery processes, the inverter 124 is not operated, and each battery B is fed to the machine in its normal position of use, i.e. with its base facing downwards.

In the following description of the successive operating stages of the machine, reference will be made to the former case in which the inverting device 124 is operated. However, the machine operation is completely analogous in the case in which the inverting device 124 is not operated.

The batteries B aligned on the part 44a of the feed conveyor 44 are transferred to the final part 44b of said conveyor. The level of the conveying surface of the portion 44b can be adjusted by adjusting the control handwheel 56 in the manner heretofore described, such that the horizontal lower wall $C_1$ of each battery B is disposed at a lower level than the lower edges of the endless belt 28 and of the periphery of the rotatable table 16. During this stage, the distance between any battery B and the next battery B along the conveyor 44 can have any value.

Because of the movement of the belt 52, each battery B comes successively into contact with the spring-loaded strips 84 of the guide device 82 and of the spring-loaded strip 88. These strips position the battery B such that it becomes disposed tangentially to the periphery of the rotatable table 16. As the battery B continues to advance, the spring-loaded strips 84 act under the action of the flat springs 86 against the vertical wall $C_2$ of the casing C facing it, such as to press the opposite vertical wall $C_3$ against the periphery of the rotatable table 16. The wall $C_3$ thus adheres securely against one or more of the plates 24, which as previously stated can be positioned about the pins 22 tangentially to the periphery of the rotatable table 16, and thus parallel to the face $C_3$. Simultaneously, the initial portion of the branch 28a of the endless belt 28 adheres against the face $C_2$ of the battery B so as to hold it against the periphery of the rotatable table 16 and rotate said table 16 by virtue of the adherence. The effect of this rotation is that the battery B leaves the final portion 44b of the feed conveyor 44, and remains suspended between the branch 28a of the endless belt 28 and the corresponding support plate 24, with its wall $C_1$ projecting below them. During this stage, no synchronisation is necessary between the feed of the batteries along the conveyor 44 and the rotation of the rotatable table 16. In this respect, at whatever point the battery B is located relative to the periphery of the rotatable table 16, there will always be at least two support plates 24 which become aligned with each other parallel to the battery face $C_3$, so as to ensure correct support. With this system it is also possible to feed successive batteries B having different dimensions and geometrical configurations.

The counterweight 40 acting on the endless belt 28 enables a continuous thrust to be applied to the batteries B in order to press them radially against the periphery of the rotatable table 16. The value of the counterweight 40 must be such as to ensure secure retention of large-size batteries, but without deforming small-size batteries.

Each battery B is brought to the cutting unit 90 by virtue of the rotation of the rotatable table 16. In this position, the rotating blades 92 come into contact with that portion of the battery B which projects below the periphery of the table 16 and of the branch 28a of the endless belt 28, so as to remove the lower horizontal wall $C_1$ of the battery B by cutting. On termination of the cutting operation, the wall $C_1$ separates from the remaining part of the battery B by gravity, and is collected and transferred away from the casing 10 by the first discharge conveyor 104. Simultaneously, the electrolytic solution contained in the battery B drains by gravity into the collection tank 110.

During the cutting operation, the two exhausters 122, which are disposed respectively upstream and downstream of the cutting unit 90, enable the cutting zone to be kept constantly under vacuum, so as to substantially reduce pollution and noise. The spray nozzles 116 spray the blades 92 during cutting, to lubricate and cool them.

As rotation of the rotatable table 16 continues, the battery B is brought to the vibrating device 108, which by acting on the upper horizontal wall of the battery B separates the contents P from the casing C of the battery B, so as to enable the contents P to be separated by gravity from the remaining part of the battery B. The second discharge conveyor 106 collects the contents P and conveys them away from the casing 10. The vibrator 108 is not operated if the machine is used with batteries B disposed with their cover facing upwards, i.e. in the case of batteries which are to undergo electrochemical recovery processes.

As rotation of the rotatable table 16 continues, the battery B is brought to the feed nozzles 118, which spray the interior of the casing C in order to remove any slime and slag.

When the remaining part of the battery B reaches an angular position corresponding to the initial portion of the third discharge conveyor 120, it is separated from the periphery of the rotatable table 16 by virtue of the withdrawal of the surface of the branch 28a of the endless belt 28. In this manner, the remaining part of the battery B is taken up by the conveyor belt 120 and conveyed away from the casing 10.

The wall $C_1$, the contents P and the remaining part of the casing C of each battery are fed to subsequent treatment and recovery stations.

It should be noted that the machine according to the invention can be used for simultaneously cutting the cover and base of the battery B by disposing a second cutting unit above the periphery of the rotatable table 16 to correspond with the first cutting unit 90, and adjusting the level of the final portion 44b of the feed conveyor 44 such that each battery B has not only a portion projecting below the table 16 and endless belt 28, but also a portion projecting above them.

Furthermore, instead of consisting of a circumferential set of positionable support plates 24, the periphery of the rotatable table 16 could consist of a soft or resiliently springy circumferential support surface resistant to sulphuric acid solutions, and arranged to assume a local flat configuration tangential to the table 16 following contact with the side walls $C_3$ of the batteries B.

In addition, the drive action which the endless belt 28 exercises on the rotatable table 16 could be provided by motorising the rotatable table 16, and using an idle endless belt 28.

From the aforegoing description it is apparent that the machine according to the invention allows high production rates to be obtained and keeps operating costs at extremely low levels, while at the same time ensuring environmental working conditions free from any form of pollution.

Within the principle of the invention, the constructional details and embodiments can be widely varied relative to that described and illustrated, without leaving the scope of the inventive idea.

I claim:

1. A method for recovering material from consumed accumulator batteries with a parallelepiped casing, comprising the following stages:
   providing a horizontal rotatable table (16),
   keeping said table (16) under continuous rotation,
   continuously feeding a row of batteries (B) tangentially to the periphery of the rotatable table (16) in such a manner as to bring one of the side walls ($C_3$) of the casing (C) of each battery (B) into contact with the periphery of the table (16), such that a portion of said side wall ($C_3$) projects below the contour of the table (16),
   exerting a radial thrust on that side wall ($C_2$) of the casing (C) of each battery (B) which is opposite the wall ($C_3$) in contact with the periphery of the table (16) such as to keep said battery (B) adhering to said table (16) over a path corresponding to a substantial angle of rotation of the table (16),
   separating the lower horizontal wall ($C_1$) of the respective casing (C) from each battery (B) by a cutting action carried out on that part of each battery (B) which projects below the contour of the rotatable table (16) while said battery (B) is adhering to the table (16), so as to enable said wall ($C_1$) to be separated from the remaining part of the battery (B) by gravity,
   releasing the radial thrust exerted on each battery (B) at the end of said path so as to enable the table (16) to be separated from said remaining part of the battery (B) by gravity.

2. A method as claimed in claim 1, further comprising, following the stage in which the lower horizontal wall ($C_1$) of the respective casing (C) is separated from each battery (B) by cutting, a stage consisting of vibrating the remaining part of each battery (B) while it is adhering to the table (16) in order to facilitate separation of the contents (P) of the battery (B) from the respective casing (C) and enable said contents (P) to be separated from the remaining part of the battery (B) by gravity.

3. A method as claimed in claim 1, wherein the stage in which a row of batteries (B) is continuously fed tangentially to the periphery of the rotatable table (16) in order to bring one of the side walls ($C_3$) of the casing (C) of each battery (B) in contact with the periphery of the table (16) is carried out such that a portion of said side wall ($C_3$) also projects above the contour of the table (16), and further comprising a stage in which the upper horizontal wall of the respective casing (C) is separated from each battery (B) by a cutting action carried out on that part of each battery (B) which projects above the contour of the table (16) while said battery (B) adheres to the table (16).

4. A machine for recovering material from consumed accumulator batteries with a parallelepiped casing, comprising:
   a horizontal rotatable table (16),
   means (28, 30) for keeping said table (16) under continuous rotation,
   feed means (44) for continuously feeding a row of batteries (B) tangentially to the periphery of the table (16) in such a manner as to bring one of the side walls ($C_3$) of the casing (C) of each battery (B) into contact with the periphery of the table (16), such that a portion of said side wall ($C_3$) projects at least below the contour of the table (16),
   means (34, 40) for exerting a radial thrust on that side wall ($C_2$) of the casing (C) of each battery (B)

which is opposite the wall (C₃) in contact with the periphery of the table (16) such as to keep said battery (B) adhering to said table (16) over a path corresponding to a substantial angle of rotation of the table (16),
cutting means (90) acting on that part of each battery (B) which projects below the contour of the table (16) while said battery (B) is adhering to the table (16), so as to separate the lower horizontal wall (C₁) of the respective casing from each battery (B),
collection means (104, 120) for receiving said horizontal walls (C₁) which separate by gravity from the remaining parts of the batteries (B) downstream of the cutting means (90), and for receiving the remaining parts of said batteries (B) which separate by gravity from the rotatable table (16) at the end of said path of the table (16).

5. A machine as claimed in claim 4, further comprising vibration means (108) acting on the remaining parts of the batteries (B) downstream of the cutting means (90) in order to facilitate separation of the contents (P) of each battery (B) from the respective casing (C), and collection means (106) for receiving the contents (P) of the batteries (B) which separate by gravity from the remaining parts of said batteries (B).

6. A machine as claimed in claim 4, wherein the periphery of the rotatable table (16) is provided with support means (24) arranged to assume a local flat configuration tangential to the table (16) following contact between said side wall (C₃) of the casing (C) of each battery (B) and the periphery of the table (16), and to maintain said configuration over the entire said path of the table (16).

7. A machine as claimed in claim 6, wherein the periphery of the table (16) is defined by a circumferential set of flat support surfaces (24) which can be positioned tangentially to the table (16).

8. A machine as claimed in claim 7, wherein said flat support surfaces (24) are constituted by plates hinged about vertical pins (22) carried by the table (16) in such a manner as to be able to make limited angular movements to enable each plate (24) to be aligned with the adjacent plate (24) tangentially to the table (16).

9. A machine as claimed in claim 8, wherein each support plate (24) has an outer surface with a high coefficient of friction.

10. A machine as claimed in claim 4, comprising an endless flexible belt (28) mobile synchronously with the rotation of the table (16) about vertical deviation rollers (30), and having a branch (28a) which faces the periphery of the table (16) along said path of the table (16), said means (34, 40) for exerting a radial thrust on that side wall (C₂) of the casing (C) of each battery (B) opposite the wall (C₃) in contact with the periphery of the table (16) acting on said branch (28a) of the endless belt (28).

11. A machine as claimed in claim 10, wherein said means for exerting a radial thrust comprise a slide (34) slidable on fixed guides (36) and carrying one of the deviation rollers (32) of said branch (28a) of the continuous belt (28), and a counterweight (40) connected to the slide (34) and tending to move said slide (34) in a direction corresponding to the radial approach of said branch (28a) of the endless belt (28) to the periphery of the table (16).

12. A machine as claimed in claim 10, wherein the endless belt (28) is motorised, and the rotatable table (16) is idle and is rotated by the endless belt (28) by adherence between said branch (28a) of the endless belt (28) and those side walls (C₂) of the batteries (B) opposite the walls (C₃) in contact with the periphery of the table (16).

13. A machine as claimed in claim 10, wherein the endless belt (28) is of an acid-resistant material, preferably of P.V.C. coated polyester fibres.

14. A machine as claimed in claim 4, wherein the means for continuously feeding a row of batteries (B) tangentially to the periphery of the table (16) comprise a feed conveyor belt (44) having a final horizontal portion (44b) positioned tangentially to the periphery of the rotatable table (16) at the initial part of said path of the rotatable table (16), said final portion (44b) being articulated relative to the remaining part (44a) of the feed conveyor belt (44) about a transverse horizontal pin (54), and being provided with precision adjustment means (56, 62, 72) for selectively adjusting the level of its conveying surface.

15. A machine as claimed in claim 14, wherein resilient guide means (82, 88) are associated with the final horizontal portion (44b) of the feed conveyor (44) in order to direct and press the batteries (B) against the periphery of the rotatable table (16).

16. A machine as claimed in claim 4, wherein the cutting means (90) comprise at least one horizontal circular blade (92) supported and rotated by a vertical motorised shaft (94), and means (96, 102) are provided for adjusting the distance of said vertical shaft (94) from the periphery of the table (16).

17. A machine as claimed in claim 16, wherein the circular blades (92) are two in number, and are side-by-side and counter-rotating.

18. A machine as claimed in claim 16 or claim 17, wherein the or each circular blade (92) is constituted by a resinoid cutting disc.

19. A machine as claimed in claim 4, wherein the collection means comprise:
a first discharge conveyor (104) with an initial portion disposed in a position underlying the cutting means (90),
a second discharge conveyor (106) with an initial portion disposed in a position underlying the periphery of the rotatable table (16) immediately downstream of the cutting means (90), and
a third discharge conveyor (120) with an initial portion disposed in a position underlying the periphery of the rotatable table (16) in a position corresponding with the final part of said path of the rotatable table (16).

20. A machine as claimed in claim 19, wherein the collection means further comprise a tank (110) for collecting the liquid contents of the batteries (P), said tank extending in a position underlying the cutting means (90) and said initial portions of the first and second discharge conveyor (104, 106).

21. A machine as claimed in claim 4, further comprising feed means (116) for feeding a cooling-lubricating liquid under pressure to the cutting means (90), and feed means (118) for feeding a wash liquid under pressure into the casings (C) of the batteries (B) downstream of the cutting means (90).

22. A machine as claimed in claims 20 and 21, wherein said feed means (116) are fed from said collection tank (110).

23. A machine as claimed in claim 4, wherein the rotatable table (16), said branch (28a) of the endless belt (28) and the cutting means (90) are housed in a closed housing (10).

24. A plant for recovering material from consumed vehicle accumulator batteries, utilising a machine as claimed in claim 4, comprising an inverting device (124) associated with the machine feed means (44) for inverting the batteries relative to their normal position of use.

25. A plant as claimed in claim 24, further comprising a depalletising device (126) arranged to receive groups of palletised batteries (B) and to transfer said batteries (B) in an aligned condition to said machine feed means (44).

* * * * *